United States Patent
Imai et al.

(10) Patent No.: US 6,566,826 B2
(45) Date of Patent: May 20, 2003

(54) POWER TRANSMITTING APPARATUS FOR HYBRID VEHICLE AND METHOD OF CONTROLLING POWER TRANSMITTING APPARATUS

(75) Inventors: Nobuyuki Imai, Wako (JP); Yutaka Tamagawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/924,678

(22) Filed: Aug. 9, 2001

(65) Prior Publication Data

US 2002/0024306 A1 Feb. 28, 2002

(30) Foreign Application Priority Data

Aug. 11, 2000 (JP) .......................... 2000-244307

(51) Int. Cl.$^7$ .................................................. B60K 6/02
(52) U.S. Cl. .............................. 318/11; 180/65.7; 477/8
(58) Field of Search .......................... 318/45, 139, 376, 318/9–15; 180/65.1–65.4, 65.6, 65.7; 477/2, 3, 5–8

(56) References Cited

U.S. PATENT DOCUMENTS 5,513,719 A * 5/1996 Moroto et al. ............. 180/65.4
6,053,842 A * 4/2000 Kitada et al. ................ 477/5
6,383,114 B1 * 5/2002 Hoshiya et al. ............. 477/2

OTHER PUBLICATIONS

Masahiko Amano, et al., Society of Automotive Engineers of Japan, Inc. Convention Preprint No. 2–00, May 2000, pp. 1–4.

Tomoyuki Hanyu, et al., Society of Automotive Engineers of Japan, Inc. Convention Preprint No. 2–00, May 2000, pp. 5–8.

* cited by examiner

Primary Examiner—Bentsu Ro
(74) Attorney, Agent, or Firm—Armstrong, Westerman & Hattori, LLP

(57) ABSTRACT

A power transmitting apparatus for a hybrid vehicle having an engine, first and second power distributors, and first and second motors includes a rotation transmitting unit for transmitting a drive power of the second motor to a power output shaft at a speed reduction ratio $\alpha 1$ greater than a speed reduction ratio $\alpha 2$ at the first power distributor and a speed reduction ratio $\alpha 3$ ($<\alpha 2$) at the second power distributor, a second clutch assembly for selectively connecting an output shaft of the first motor to the first power distributor and an output shaft of the engine, and a first clutch assembly for selectively connecting an output shaft of the second motor to the second power distributor and the rotation transmitting unit. A controller controls operation of the clutch assemblies and the motors depending on an operating state of the hybrid vehicle.

11 Claims, 5 Drawing Sheets

LOW-SPEED-RANGE ENGINE-DRIVEN MODE

TEMPORARILY USED ENGINE-DRIVEN MODE

MEDIUM-AND HIGH-SPEED-RANGE ENGINE-DRIVEN MODE

SERIES-OPERATED EV MODE

SERIES-INTERRUPTED EV MODE

US 6,566,826 B2

POWER TRANSMITTING APPARATUS FOR HYBRID VEHICLE AND METHOD OF CONTROLLING POWER TRANSMITTING APPARATUS

BACKGROUND OF THE INVENTION

1. Field of the Invention

The present invention relates to a power transmitting apparatus for a hybrid vehicle and a method of controlling such a power transmitting apparatus.

2. Description of the Related Art

There is known a power transmitting apparatus for a hybrid vehicle which has two power distributors and two motors that can operate in both propulsive and regenerative modes. For example, reference should be made to "Basic configuration of a parallel differential structured electric transmission system for hybrid electric vehicles" and "Characteristic evaluation of a parallel differential structured electric transmission system for hybrid electric vehicles", Society of Automotive Engineers of Japan, Inc. Convention Preprint No. 2-00, May 2000.

A conceptual arrangement of the known power transmitting apparatus is shown in FIG. 6 of the accompanying drawings.

In the power transmitting apparatus, the rotational drive power from an output shaft $100a$ of an engine $100$ is distributed and transmitted to input shafts $101a$, $102a$ of respective two power distributors $101$, $102$ through gears, not shown. The power distributors $101$, $102$ comprise differential gear mechanisms or planetary gear mechanisms, and have two output shafts $101b$, $101c$ and two output shafts $102b$, $102c$, respectively. The power distributors $101$, $102$ operate to generate a torque at a constant speed reduction ratio on their two output shafts regardless of the difference between the rotational speeds of the output shafts.

The output shafts $101b$, $102b$ of the power distributors $101$, $102$ are connected to a common power output shaft $105$ by respective rotation transmitting mechanisms $103$, $104$ which have different speed reduction ratios $\alpha$, $\beta$ ($\alpha$, $\beta$). The other output shafts $101c$, $102c$ of the power distributors $101$, $102$ are connected to respective rotatable shafts $106a$, $107a$ of motors $106$, $107$. The common power output shaft $105$ is connected to the axle of drive wheels of a vehicle (hybrid vehicle), not shown. More precisely, the speed reduction ratios $\alpha$, $\beta$ represent speed reduction ratios including those of the power distributors $101$, $102$. For illustrative purposes, however, the speed reduction ratios of the power distributors $101$, $102$ are herein assumed to be "1".

When the engine $100$ is operated and the motors $106$, $107$ are controlled to operate in propulsive and regenerative modes, respectively, to equalize the electric power consumed by the motor $106$ with the electric power generated by the motor $107$, part of the mechanical energy produced by the output shaft $100a$ of the engine $100$ is converted into electric energy by the motor $107$, and the electric energy is then converted back into mechanical energy by the motor $106$. The mechanical energy produced by the motor $106$ is transmitted to the power output shaft $105$. The remainder of the mechanical energy from the engine $100$ is mechanically transmitted to the power output shaft $105$ without going through the motors $106$, $107$.

Since equilibrium is maintained between the energy consumed by the motor $106$ and the energy generated by the motor $107$ (it is assumed that energy losses caused by the motors $106$, $107$ are ignored), a torque Te produced by the output shaft $100a$, i.e., a torque as a load on the engine $100$, and a torque Tv transmitted to the power output shaft $105$ are related to each other as indicated by the following equation (1):

$$Tv = (\omega e/\omega v) \cdot Te \qquad (1)$$

where $\omega e$ represents the rotational speed of the output shaft $100a$ and $\omega v$ the rotational speed of the power output shaft $105$. Therefore, $\omega e/\omega v$ represents a speed reduction ratio for transmitting the rotation from the output shaft $100a$ to the power output shaft $105$.

The speed reduction ratio $\omega e/\omega v$ between the output shaft $100a$ and the power output shaft $105$ can be changed to any speed reduction ratio between the speed reduction ratio $\alpha$ of the rotation transmitting mechanism $103$ and the speed reduction ratio $\beta$ of the rotation transmitting mechanism $104$ by controlling the torques generated at the motors $106$, $107$.

Consequently, when the vehicle is propelled by the engine $100$ as a propulsion source, the speed reduction ratio $\omega e/\omega v$ between the output shaft $100a$ and the power output shaft $105$, i.e., a transmission ratio, can continuously be changed by controlling the torques of the motors $106$, $107$ while equalizing the electric power consumed by the motor $106$ and the electric power generated by the motor $107$ with each other. The power transmitting apparatus thus serves as an electric continuously variable transmission system for transmitting the output of the engine $1$ to the power output shaft $105$ to propel the vehicle, without the need for a mechanical transmission such as a pulley and belt type CVT or the like.

Another known electric continuously variable transmission system comprises a power transmitting apparatus having one power distributor and two motors. This electric continuously variable transmission system requires the motors to generate a greater torque than the power transmitting apparatus shown in FIG. 6 in its operation for continuously variable transmission. Consequently, the electric continuously variable transmission system is disadvantageous in that it needs large-capacity motors and their drive circuits and tends to cause an energy loss because more energy is transmitted from engine via the motors to the axle.

With the power transmitting apparatus shown in FIG. 6, if the torques of the motors $106$, $107$ are represented respectively by T1, T2, then in the state of equilibrium, the torque Te of the output shaft $100a$, i.e., the torque as the load on the engine $100$, and the torque Tv of the power output shaft $105$ are related to each other according to the following equations (2), (3) (it is assumed that each of the power distributors $101$, $102$ comprises a differential gear mechanism):

$$Te/2 = T1 + T2 \qquad (2)$$

$$Tv = \alpha \cdot T1 + \beta \cdot T2 \qquad (3)$$

By controlling the torques T1, T2 of the motors $106$, $106$, it is possible to impart a desired load torque Te to the output shaft $100a$ of the engine $100$ and to generate a desired torque Tv on the power output shaft $105$. The torques T1, T2 of the motors $106$, $107$ are controlled to cause the load torque Te on the output shaft $100a$ to become "0", and a torque is generated on the power output shaft $105$ to propel the vehicle, thereby holding the engine $100$ at rest and propelling the vehicle with the drive power from the motor (EV mode=electric vehicle mode). In order to cause the load torque Te on the output shaft $100a$ to become "0", the motors $106$, $107$ are operated in the propulsive mode and the regenerative mode, respectively, and part of the propulsive torque of the motor 106, i.e., part of the torque transmitted from the motor 106 to the engine 100, and part of the regenerative torque of the motor 107, i.e., part of the torque transmitted from the motor 107 to the engine 100, cancel out each other.

The hybrid vehicle which incorporates the power transmitting apparatus shown in FIG. 6 can travel at different transmission ratios with the engine 100 used as the propulsion source, or can travel in the EV mode with the motor used as the propulsion source. If necessary, it is possible to add the assistive propulsive power from the motor to the propulsive power from the engine 100 by, for example, making the electric power consumed by the motor 106 which produces the propulsive power greater than the electric power generated by the motor 107 which operates in the regenerative mode, or to charge the power supply for the motor by, for example, making the electric power generated by the motor 107 greater than the electric power consumed by the motor 106.

Generally, a motor that needs to produce a large torque requires itself, a drive circuit therefor, and a power supply (electric energy storage unit) therefor to have large capacities, and hence to have large sizes, large weights, and high costs. For this reason, it is desired for motors mounted on a hybrid vehicle to produce as small a torque as possible. It is also desired for a hybrid vehicle to be able to transmit substantially the same drive power as required on ordinary automobiles to the drive wheels thereof.

The conventional power transmitting apparatus described above fails to meet the above requirements, and there has been a demand for an improvement in the conventional power transmitting apparatus.

Specifically, the conventional power transmitting apparatus shown in FIG. 6 makes it difficult to substantially increase the speed reduction ratio α of the power distributor 101, for example, up to a speed reduction ratio corresponding to the low gear position of an ordinary automobile. If the speed reduction ratio α of the power distributor 101 is increased, then when the engine 100 suffers a failure and is brought to a stop, the rotatable shaft 106a of the motor 106 is rotated at a high speed by the output shaft 101b of the power distributor 101, operating the motor 106 in the regenerative mode. Because the voltage of the electric energy generated by the motor 106 is high, the capacity of the drive circuit for the motor 106 needs to be larger than would be required for the normal operation of the vehicle to meet fail-safe requirements. A bearing mechanism for supporting the rotatable shaft 106a also needs to be highly durable and expensive for allowing the shaft 106a to rotate at high speeds. One solution would be to provide a clutch between the motor 106 and the power distributor 101 and disengage the clutch upon a failure of the engine 100. However, the large-capacity drive circuit and the durable and expensive bearing mechanism are still required because the rotatable shaft 106a rotates at a high speed until the clutch is disengaged upon a failure of the engine 100.

With the conventional power transmitting apparatus shown in FIG. 6, therefore, it is difficult to substantially increase the speed reduction ratio α of the power distributor 101. The speed reduction ratio α is set to a speed reduction ratio corresponding to the second gear position, for example, of an ordinary automobile.

Since the speed reduction ratio α cannot substantially be increased, as described above, when the vehicle travels at different transmission ratios with the engine 100 used as the propulsion source, only the output power of the engine 100 is not sufficient as the drive power of the vehicle in a low vehicle speed range which requires a large propulsive power level. In such a case, the vehicle needs the assistive propulsive power from the motor 106. As a result, the torque to be provided by the motor 106 needs to be large, making it difficult to reduce the capacity of the motor 106 and the capacity of its drive circuit. In addition, it is also difficult to reduce the capacity of the power supply (electric energy storage unit) for the motors 106, 107 as situations where the electric energy stored by the power supply is consumed in the low vehicle speed range are highly likely to occur.

With the conventional power transmitting apparatus shown in FIG. 6, when the vehicle travels in the EV mode with the motor used as the propulsion source and the engine 100 at rest, part of the propulsive torque generated at the motor 106 and part of the regenerative torque generated at the motor 107 cancel out each other because the torque of the output shaft 100a is controlled to be "0". Consequently, the efficiency with which to transmit the drive power from the motor 106 to the drive wheels of the vehicle is poor, and the propulsive torque of the motor 106 and the regenerative torque of the motor 107 for obtaining the desired propulsive power for the vehicle are large. Furthermore, when the engine 100 is to be started while the vehicle is running in the EV mode, the propulsive torque required by the motor 106 is required to be large because of the need for the torque to start the engine 100. As a result, it is difficult to reduce the capacities of the motors 106, 107 and their drive circuits.

The conventional power transmitting apparatus shown in FIG. 6 also allows the vehicle to be started with the output of the engine 100. When the vehicle is to be started, i.e., in a situation where the vehicle speed is "0" and the rotational speeds of the output shafts 101b, 102b of the power distributors 101, 102 are "0", both the motors 106, 107 operate in the regenerative mode, converting the mechanical output energy of the engine 100 into electric energy. Therefore, the regenerated electric power of the motors 106, 107 is large. Consequently, it is difficult to reduce the capacities of the motors 106, 107 and their drive circuits and the capacities of the power supplies of the motors 106, 107.

As described above, with the conventional power transmitting apparatus shown in FIG. 6, it is difficult to reduce the capacities of the motors 106, 107 and their drive circuits and the capacities of the power supplies (electric energy storage units) of the motors 106, 107 while maintaining the running performance required by the vehicle.

SUMMARY OF THE INVENTION

It is therefore an object of the present invention to provide a power transmitting apparatus for a hybrid vehicle which makes it possible to reduce the capacities of motors and their drive circuits and the capacities of power supplies of the motors while maintaining the running performance required by the hybrid vehicle, and a method of controlling such a power transmitting apparatus.

To achieve the above object, there is provided in accordance with the present invention a power transmitting apparatus for a hybrid vehicle, comprising first and second power distributors having respective input shafts for receiving a rotational drive power transmitted from an engine, a power output shaft for outputting the rotational drive power transmitted from an output shaft of the first power distributor and an output shaft of the second power distributor, to drive wheels of the hybrid vehicle, a first motor for applying a propulsive torque or a regenerative torque to another output shaft of the first power distributor, a second motor for applying a propulsive torque or a regenerative torque to another output shaft of the second power distributor, a first rotation transmitting system for transmitting rotation from the engine through the first power distributor to the power output shaft, a second rotation transmitting system for transmitting rotation from the engine through the second power distributor to the power output shaft, the first rotation transmitting system having a speed reduction ratio greater than a speed reduction ratio of the second rotation transmitting system, rotation transmitting means for transmitting a torque of the second motor to the power output shaft at a speed reduction ratio greater than the speed reduction ratio of the first rotation transmitting system, and first clutch means for selectively connecting a rotatable shaft of the second motor to the rotation transmitting means and the other output shaft of the second power distributor.

The speed reduction ratio of the rotation transmitting means, the speed reduction ratio of the first power transmitting system, and the speed reduction ratio of the second power transmitting system are represented respectively by $\alpha 1$, $\alpha 2$, $\alpha 3$ ($\alpha 1 > \alpha 2 > \alpha 3$).

When the rotatable shaft of the second motor is connected to the other output shaft of the second power distributor by the first clutch means, the power transmitting apparatus operates basically in the same manner as with the conventional power transmitting apparatus shown in FIG. 6. For example, when the hybrid vehicle is propelled by the engine as the propulsion source, the first motor is controlled to operate in the propulsive mode and the second motor is controlled to operate in the regenerative mode. The hybrid vehicle is now propelled at a transmission ratio between the speed reduction ratio $\alpha 2$ of the first rotation transmitting system and the speed reduction ratio $\alpha 3$ of the second rotation transmitting system.

When the rotatable shaft of the second motor is connected to the rotation transmitting means by the first clutch means, the first motor is controlled to operate in the regenerative mode and the second motor is controlled to operate in the propulsive mode, propelling the hybrid vehicle with the engine as the propulsion source at a transmission ratio between the speed reduction ratio $\alpha 2$ of the first rotation transmitting system and the speed reduction ratio $\alpha 1$ of the rotation transmitting means. It is also possible to transmit the drive power of the second motor via the rotation transmitting means with the large speed reduction ratio $\alpha 1$ to the power output shaft for thereby propelling the hybrid vehicle. In a low speed range of the hybrid vehicle, even if the torques generated by the first and second motors are relatively low, it is possible to transmit a relatively large drive power to the power output shaft and then from the power output shaft to the drive wheels of the hybrid vehicle.

According to the present invention, therefore, it is possible to reduce the capacities of the motors, drive circuits thereof, and a power supply thereof while maintaining the required running performance of the hybrid vehicle.

Since the speed reduction ratio achieved with the rotatable shaft of the second motor being connected to the second power distributor by the first cluch means is smaller than the speed reduction ratio achieved with the rotatable shaft of the second motor being connected to the rotation transmitting means, the rotatable shaft of the second motor is disconnected from the rotation transmitting means and is connected to the second power distributor in a high speed range of the hybrid vehicle. Therefore, even if the engine fails and is stopped while the hybrid vehicle is being propelled by the engine used as the propulsion source, the rotatable shafts of the first and second motors are not rotated at a high speed.

Preferably, the power transmitting apparatus further comprises second clutch means for selectively connecting a rotatable shaft of the first motor to an output shaft of the engine and the other output shaft of the first power distributor.

When the rotatable shaft of the first motor is connected to the first power distributor by the second clutch means, the hybrid vehicle is propelled as described above. When the rotatable shaft of the first motor is connected to the output shaft of the engine by the second clutch means and the rotatable shaft of the second motor is connected to the rotation transmitting means by the first clutch means, the drive power of the second motor is transmitted via the rotation transmitting means directly to the power output shaft and then to the drive wheels of the hybrid vehicle, thus propelling the hybrid vehicle with only the drive power of the second motor (EV mode). At the same time, the drive power of the engine is directly applied to the second motor to operate the second motor in a regenerative mode, thus operating the hybrid vehicle as a so-called series type hybrid vehicle (series-operated mode). At this time, the drive power of the second motor can be transmitted directly to the engine to start the engine. Therefore, the series-operated mode can intermittently be performed.

In the EV mode, the propulsive torque of the second motor is not transmitted to the first motor and the engine, but transmitted to the drive wheels of the hybrid vehicle via the rotation transmitting means having the large speed reduction ratio $\alpha 1$. Consequently, the hybrid vehicle can travel in the EV mode efficiently with the relatively small propulsive torque of the first motor. When the second motor operates in the regenerative mode, since the output of the engine can be applied directly to the second motor, the second motor can operate efficiently in the regenerative mode. For starting the engine with the second motor, since the drive power of the second motor is transmitted to only the engine, the engine can be started with the relatively small propulsive torque. As a result, the hybrid vehicle can travel efficiently (including the series-operated mode).

According to the present invention, there is also provided a method of controlling the power transmitting apparatus with the first clutch means as described above. According to a first aspect of the present invention, to propel the hybrid vehicle with the engine used as a propulsion source thereof while operating the power transmitting apparatus at a transmission ratio between the speed reduction ratio $\alpha 3$ of the second rotation transmitting system and the speed reduction ratio $\alpha 1$ of the rotation transmitting means, the method comprises the steps of, while the hybrid vehicle is being propelled at a transmission ratio between the speed reduction ratio $\alpha 1$ of the rotation transmitting means and the speed reduction ratio $\alpha 2$ of the first rotation transmitting system, controlling the first clutch means to connect the rotatable shaft of the second motor to the rotation transmitting means, and controlling the first motor and the second motor to operate in a regenerative mode and a propulsive mode, respectively, and, while the hybrid vehicle is being propelled at a transmission ratio between the speed reduction ratio $\alpha 2$ of the first rotation transmitting system and the speed reduction ratio $\alpha 3$ of the second rotation transmitting system, controlling the first clutch means to connect the rotatable shaft of the second motor to the other output shaft of the second power distributor, and controlling the first motor and the second motor to operate in a propulsive mode and a regenerative mode, respectively.

If the power transmitting means has the second clutch means, then the second clutch means is controlled to connect the rotatable shaft of the first motor to the other output shaft of the first power distributor regardless of the transmission ratio at which the hybrid vehicle is traveling.

By thus controlling the first and second clutch means and the first and second motors, when the hybrid vehicle is propelled at a transmission ratio by the engine used as the propulsion source, a propulsive power required for the hybrid vehicle is maintained to propel the hybrid vehicle smoothly without the need for large torques generated at the first and second motors.

According to the first aspect of the present invention, furthermore, upon transition from one of the transmission ratio between the speed reduction ratio $\alpha 1$ of the rotation transmitting means and the speed reduction ratio $\alpha 2$ of the first rotation transmitting system and the transmission ratio between the speed reduction ratio $\alpha 2$ of the first rotation transmitting system and the speed reduction ratio $\alpha 3$ of the second rotation transmitting system to the other, the method preferably comprises the steps of temporarily controlling a rotational speed of the first motor at substantially zero, and controlling the first clutch to disconnect the rotatable shaft of the second motor from both the other output shaft of the second power distributor and the rotation transmitting means, and adjusting a rotational speed of the second motor. If the power transmitting means has the second clutch means, then the second clutch means is controlled to connect the rotatable shaft of the first motor to the other output shaft of the first power distributor upon transition between the transmission ratios.

Specifically, upon transition from one of the transmission ratio between the speed reduction ratios $\alpha 1$, $\alpha 2$ and the transmission ratio between the speed reduction ratios $\alpha 2$, $\alpha 3$ to the other, since the rotational speed of the second motor generally tends to vary discontinuously across the transition, the rotatable shaft of the second motor is disconnected from both the other output shaft of the second power distributor and the rotation transmitting means, and the rotational speed of the second motor is adjusted. At this time, the rotational speed of the first motor is controlled at substantially zero, bringing the transmission ratio (speed reduction ratio) of the system ranging from the engine to the power output shaft into conformity with the speed reduction ratio $\alpha 2$ at the boundary between the transmission ratio between the speed reduction ratios $\alpha 1$, $\alpha 2$ and the transmission ratio between the speed reduction ratios $\alpha 2$, $\alpha 3$. By thus performing the above control process, the transition between the above transmission ratios can smoothly be carried out without causing behavioral changes of the hybrid vehicle.

According to a second aspect of the present invention, a method of controlling the power transmitting apparatus comprises the steps of, for starting the hybrid vehicle, cutting off a current supplied to the first motor, controlling the first clutch means to connect the rotatable shaft of the second motor to the rotation transmitting means, and controlling the second motor to operate in a propulsive mode.

If the power transmitting apparatus has the second clutch means, then for starting the hybrid vehicle, the second clutch means is controlled to disconnect the rotatable shaft of the first motor from at least the other output shaft of the first power distributor, and the first clutch means is controlled to connect the rotatable shaft of the second motor to the rotation transmitting means, and the second motor is controlled to operate in the propulsive mode.

Therefore, irrespective of whether the engine is operating or not, the propulsive torque of the second motor is transmitted directly to the drive wheels of the hybrid vehicle to start the hybrid vehicle. Inasmuch as the propulsive torque of the second motor is efficiently transmitted directly to the drive wheels of the hybrid vehicle via the rotation transmitting means having the large speed reduction ratio $\alpha 1$, the hybrid vehicle can be started smoothly even if the propulsive torque of the second motor is relatively small. The capacity of the second motor can thus be reduced.

According to a third aspect of the present invention, there is provided a method of controlling the power transmitting apparatus having the second clutch means. To propel the hybrid vehicle at a predetermined vehicle speed or lower with one of the motors used as a propulsion source thereof, the method comprises the steps of controlling the second motor to operate in a propulsive mode, controlling the first clutch means to connect the rotatable shaft of the second motor to the rotation transmitting means, and controlling the second clutch means to disconnect the rotatable shaft of the first motor from at least the other output shaft of the first power distributor.

With the above method, the propulsive torque of the second motor is efficiently transmitted directly to the drive wheels of the hybrid vehicle to operate the hybrid vehicle in the EV mode. By operating the hybrid vehicle in the EV mode in a relatively low speed range lower than a given vehicle speed, the propulsive torque required for the second motor and the rotational speed of the rotatable shaft of the second motor are held to low levels.

According to the third aspect of the present invention, the method preferably further comprises the steps of controlling the second clutch means to connect the rotatable shaft of the first motor to the output shaft of the engine, and controlling the first motor to operate in a regenerative mode while operating the engine.

Alternatively, the method preferably further comprises the steps of controlling the second clutch means to connect the rotatable shaft of the first motor to the output shaft of the engine, intermittently operating the engine, controlling the first motor to operate in a regenerative mode while the engine is operating, and for starting the engine from a stop, controlling the first motor in a propulsive mode to start the engine with a drive power of the first motor.

With the above arrangement, as described above, the first motor can efficiently be operated in the regenerative mode by the output of the engine to operate the hybrid vehicle in the series-operated mode or operate the hybrid vehicle intermittently in the series-operated mode, independently of the travel of the hybrid vehicle with the propulsive torque of the second motor. If the hybrid vehicle operates intermittently in the series-operated mode, when the engine is started by the first motor, since the first motor is not required to produce a large propulsive torque, the capacity of the first motor can be reduced.

As described above, the method of controlling the power transmitting apparatus for the hybrid vehicle according to the present invention is able to efficiently operate the hybrid vehicle in various modes without the need for large torques of the first and second motors, so that the capacities of the motors, drive circuits thereof, and a power supply thereof can be reduced.

In view of the energy efficiency of the engine, the mode in which the hybrid vehicle is propelled at transmission ratios by the engine used as the propulsion source should preferably take place in a high vehicle speed range in which the vehicle speed is relatively high or in a situation where the required propulsive power for the hybrid vehicle is relatively large. The EV mode (including the series-operated mode) should preferably occur in a relatively low vehicle speed range or in a situation where the required propulsive power for the hybrid vehicle is relatively small.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
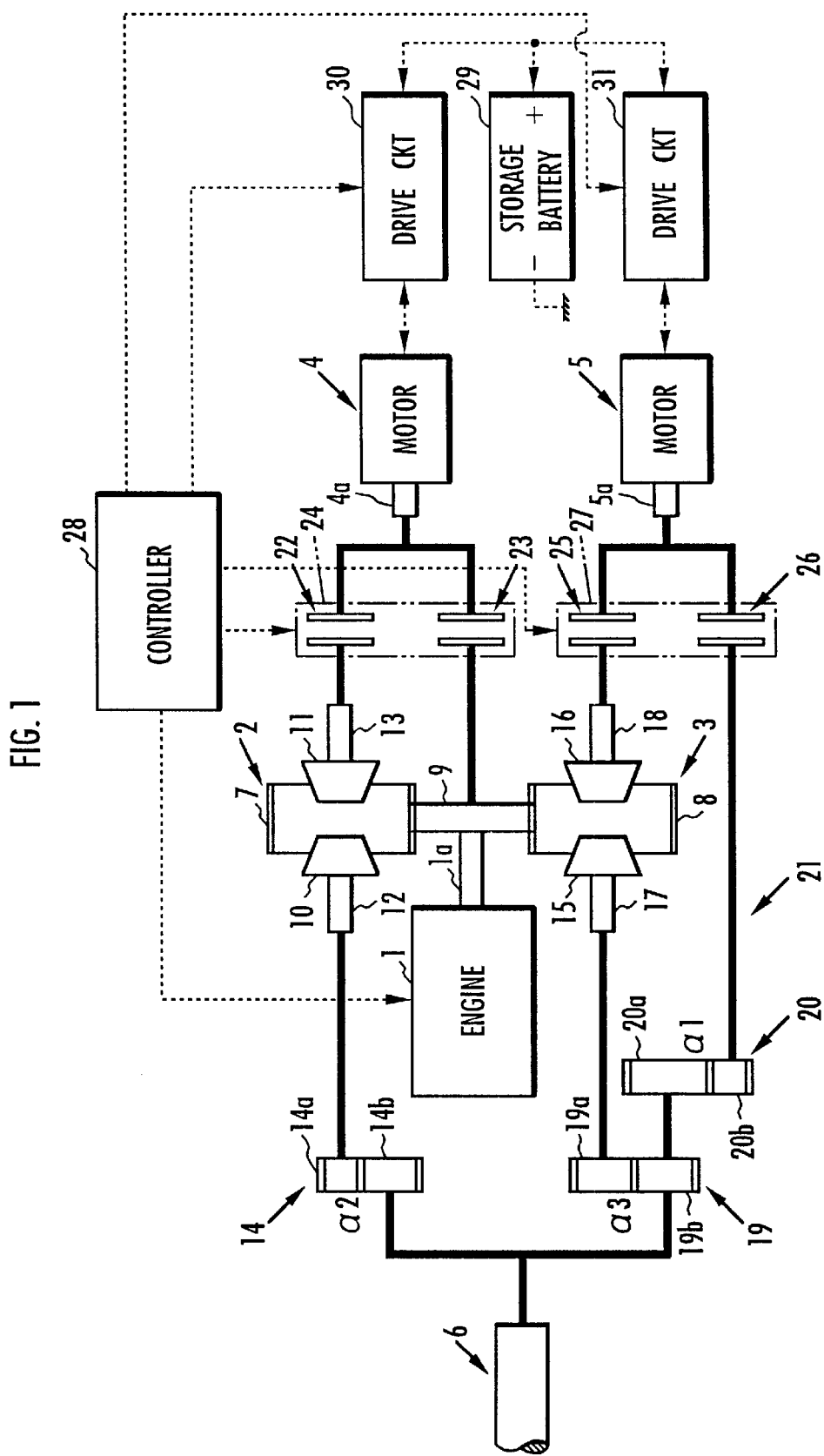
FIG. 1 is a schematic view, partly in block form, of a power transmitting apparatus according to an embodiment of the present invention.

As shown in FIG. 1, a power transmitting apparatus for a hybrid vehicle according to the present invention has an engine 1, first and second power distributors 2, 3, first and second motors 4, 5, and a power output shaft 6. The power output shaft 6 is connected to the axle of drive wheels of the hybrid vehicle.

Each of the first and second power distributors 2, 3 comprises a differential gear mechanism. The first and second power distributors 2, 3 have respective ring gears 7, 8 serving as input shafts to which the rotational drive power from the engine 1 is transmitted. The ring gears (input shafts) 7, 8 are coupled to an output shaft 1a of the engine 1 by a gear 9, so that the transfer of rotation between the ring gears 7, 8 and the output shaft 1a is performed through the gear 9.

Of the first and second power distributors 2, 3, the first power distributor 2 has two side gears 10, 11 and two output shafts 12, 13 rotatable in unison with the side gears 10, 11, respectively. The output shaft 12 is coupled to the power output shaft 6 by a speed reducer 14 which comprises a pair of intermeshing gears 14a, 14b, so that the transmission of rotation from the output shaft 12 to the power output shaft 6 is performed through the speed reducer 14.

Similarly, the second power distributor 3 has two side gears 15, 16 and two output shafts 17, 18 rotatable in unison with the side gears 15, 16, respectively. The output shaft 17 is coupled to the power output shaft 6 by a speed reducer 19 which comprises a pair of intermeshing gears 19a, 19b, so that the transmission of rotation from the output shaft 17 to the power output shaft 6 is performed through the speed reducer 19.

Of the gears 19a, 19b of the speed reducer 19, the gear 19b connected to the power output shaft 6 is coupled to a rotation transmitting means 21 comprising a speed reducer 20 which comprises a pair of intermeshing gears 20a, 20b.

The first motor 4 has a rotatable shaft 4a connected to two clutches 22, 23 by gears, not shown, for imparting a propulsive torque or a regenerative torque to the clutches 22, 23 in parallel relation. The rotatable shaft 4a is coupled to the output shaft 13 of the power distributor 2 by the clutch 22 for selectively transmitting rotation between itself and the output shaft 13, and is also coupled to the output shaft 1a of the engine 1 by the clutch 23 for selectively transmitting rotation between itself and the output shaft 1a.

The clutches 22, 23 jointly serve as a second clutch means 24.

The second motor 5 has a rotatable shaft 5a connected to two clutches 25, 26 by gears, not shown, for imparting a propulsive torque or a regenerative torque to the clutches 25, 26 in parallel relation. The rotatable shaft 5a is coupled to the output shaft 18 of the power distributor 3 by the clutch 25 for selectively transmitting rotation between itself and the output shaft 18, and is also coupled to the speed reducer 20 of the rotation transmitting means 21 by the clutch 26 for selectively transmitting rotation between itself and the speed reducer 20.

Since the speed reducer 20 is coupled to the gear 19b of the speed reducer 19 which is connected to the power output shaft 6, the torque transmitted from the motor 5 to the speed reducer 20 when the clutch 26 is engaged is transmitted from the speed reducer 20 directly to the power output shaft 6.

The clutches 25, 26 jointly serve as a first clutch means 27.

The speed reducer 14 has a speed reduction ratio $\alpha 2$ which is specifically a speed reduction ratio for the transmission of rotation from the output shaft 12 of the first power distributor 2 to the power output shaft 6. The speed reducer 19 has a speed reduction ratio $\alpha 3$ which is specifically a speed reduction ratio for the transmission of rotation from the output shaft 17 of the second power distributor 3 to the power output shaft 6. The speed reducer 20 has a speed reduction ratio $\alpha 1$ which is specifically a speed reduction ratio for the transmission of rotation from the clutch 26 to the power output shaft 6. These speed reduction ratios are related to each other by $\alpha 1 > \alpha 2 > \alpha 3$. More specifically, the speed reduction ratios $\alpha 1, \alpha 2, \alpha 3$ correspond respectively to the low gear position, the second gear position, and the fifth gear position of the transmission of an ordinary automobile.

The hybrid vehicle also has a controller 28 for controlling the above power transmitting apparatus.

The controller 28 comprises a microcomputer or the like, and is able to control operation of the engine 1, the first and second clutch means 27, 24, and the first and second motors 4, 5. The controller 28 controls operation of the engine 1 with throttle valves, a fuel supply device, an ignition device, etc. The controller 28 controls operation of the first and second clutch means 27, 24 with actuators, not shown. The controller 28 also controls operation of the first and second motors 4, 5 with drive circuits 30, 31 that are electrically connected between an electric energy storage unit 29 such as a secondary battery or a capacitor which serves as a power supply for the motors 4, 5 and the motors 4, 5.

The controller 28 is supplied with operation status information representing an amount of movement of the accelerator operated by the driver of the vehicle, a vehicle speed, a rotational speed of the engine 1, etc. from various sensors, not shown.

Operation of the power transmitting apparatus will be described below.

The hybrid vehicle has two basic modes of operation including an engine-drive mode in which the vehicle travels with the engine 1 used as a main propulsion source and an EV mode in which the vehicle travels with the second motor 5 used as a main propulsion source.

The engine-drive mode comprises a plurality of modes including a low-speed-range engine-driven mode in which the vehicle travels while the power transmitting apparatus is operating at a speed reduction ratio between the speed reduction ratio $\alpha 1$ of the speed reducer 20 and the speed reduction ratio $\alpha 2$ of the speed reducer 14, a medium- and high-speed-range engine-driven mode in which the vehicle travels while the power transmitting apparatus is operating at a speed reduction ratio between the speed reduction ratio $\alpha 2$ of the speed reducer 14 and the speed reduction ratio $\alpha 3$ of the speed reducer 19, and a temporarily used engine-driven mode that is temporarily used upon transition from one of the low-speed-range engine-driven mode and the medium- and high-speed-range engine-driven mode to the other.

The EV mode comprises a plurality of modes including a series-operated EV mode in which the vehicle travels while the first motor 4 is operating in a regenerative mode with the output from the engine 1, and a series-interrupted EV mode in which the vehicle travels while the engine 1 and the first motor 4 are not operating. The series-operated EV mode is a mode in which the electric energy storage unit 29 is charged by electric energy produced by the first motor 4 operating in the regenerative mode. The series-interrupted EV mode is a mode in which the vehicle travels while the electric energy stored in the electric energy storage unit 29 is being consumed by the second motor 5.

According to the present embodiment, basically, the controller 28 recognizes a demand drive power (demand propulsive power) for the vehicle using a map or the like determined in advance from the amount of movement of the accelerator pedal operated by the driver and the vehicle speed, and selectively establishes one of the above modes based on the demand drive power and the vehicle speed. The controller 28 then controls the power transmitting apparatus depending on the established mode, as described later on.

Figure 2:
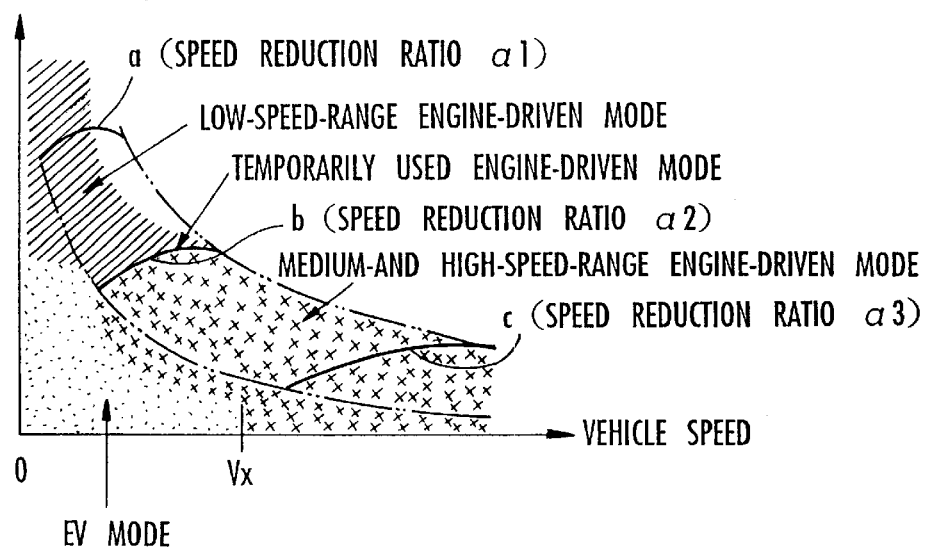
FIG. 2 is a diagram illustrative of the principles of operation of the power transmitting apparatus shown in FIG. 1.

The controller 28 establishes a mode based on the demand drive power and the vehicle speed, as shown in FIG. 2. Basically, the controller 28 establishes the low-speed-range engine-driven mode in an area where the vehicle speed is in a low speed range and the demand drive power is relatively large, i.e., a hatched area in FIG. 2. The controller 28 establishes the medium- and high-speed-range engine-driven mode in an area where the vehicle speed is in a high speed range or a medium speed range greater than a predetermined vehicle speed Vx and the demand drive power is relatively large, i.e., an area indicated by symbols x in FIG. 2. The controller 28 establishes the temporarily used engine-driven mode in a boundary area between the area corresponding to the low-speed-range engine-driven mode and the area corresponding to the medium- and high-speed-range engine-driven mode, i.e., an area along a curve "b"in FIG. 2. The controller 28 establishes the EV mode in an area where the the vehicle speed is in a low speed range lower than the predetermined vehicle speed Vx and the demand drive power is relatively small, i.e., a stippled area in FIG. 2.

According to the present embodiment, the controller 28 basically establishes a mode based on the demand drive power and the vehicle speed in a manner to make better the efficiency of fuel consumption by the engine 1 as much as possible.

Curves "a", "b", "c" related to the engine-driven modes in FIG. 2 represent maximum drive powers for the vehicle that can be generated from the output of the engine 1 when the transmission ratio of the power transmitting apparatus is fixed to the speed reduction ratios $\alpha 1$, $\alpha 2$, $\alpha 3$, respectively. Of the engine-drive modes, the temporarily used engine-driven mode is a mode that is established on the curve "b" corresponding to the speed reduction ratio $\alpha 2$.

Figure 3:
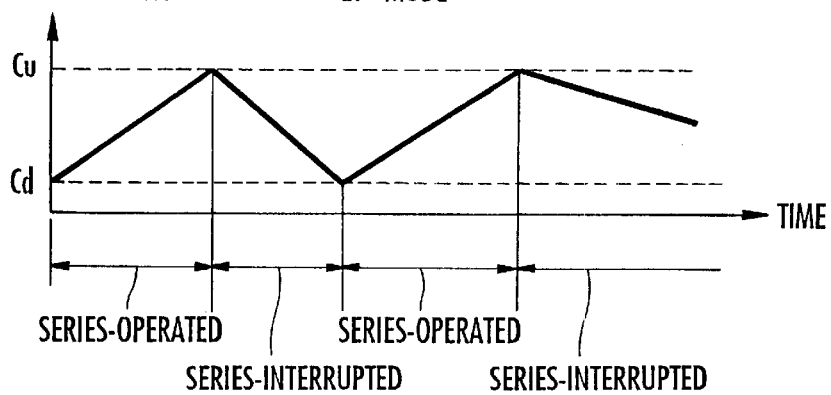
FIG. 3 is a diagram illustrative of the principles of operation of the power transmitting apparatus shown in FIG. 1.

In the EV mode, the controller 28 selectively switches between the series-operated EV mode and the series-interrupted EV mode depending on the remaining capacity of the electric energy storage unit 29. Specifically, if the remaining capacity of the electric energy storage unit 29 drops to a given lower limit threshold Cd as shown in FIG. 3, then the controller 28 establishes the series-operated EV mode in order to charge the electric energy storage unit 29, and if the remaining capacity of the electric energy storage unit 29 that is charged increases up to a given upper limit threshold Cu, then the controller 28 establishes the series-interrupted EV mode. In the EV mode, therefore, the controller 28 alternately repeats the series-operated EV mode and the series-interrupted EV mode.

Actually, the controller 28 does not uniquely establishes a mode from the demand drive power and the vehicle speed at all times, but establishes a mode in view of behavioral changes of the vehicle particularly in the vicinity of the boundaries between the areas corresponding to the various modes.

The controller 28 controls the power transmitting apparatus in the respective modes that are established thereby as described above, as follows:

First, the engine-drive modes will be described below with reference to FIGS. 4(a) through 4(c).

Figure 4:
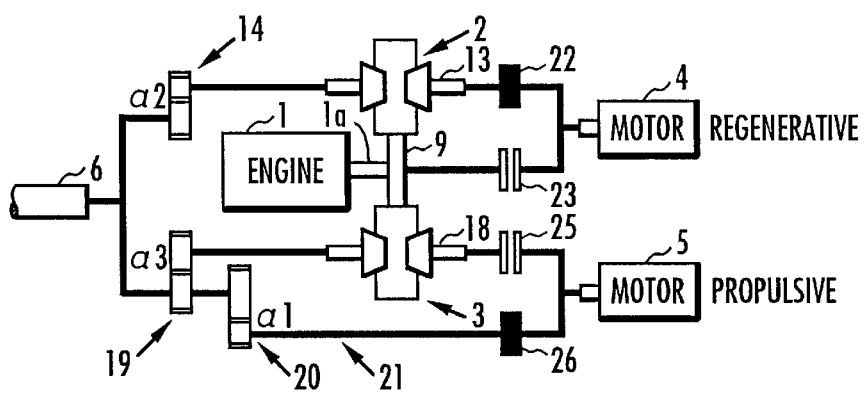
FIGS. 4(a) through 4(c) are schematic views, partly in block form, showing the manner in which the power transmitting apparatus shown in FIG. 1 operates.
Figure 4:
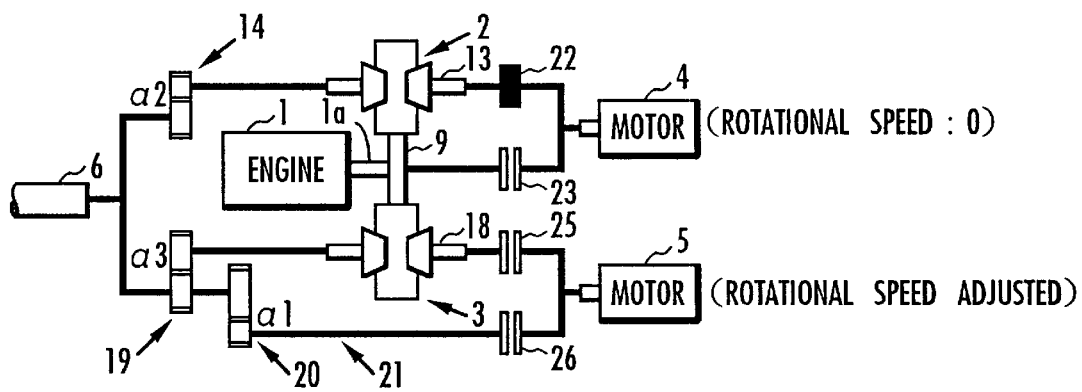
Figure 4:
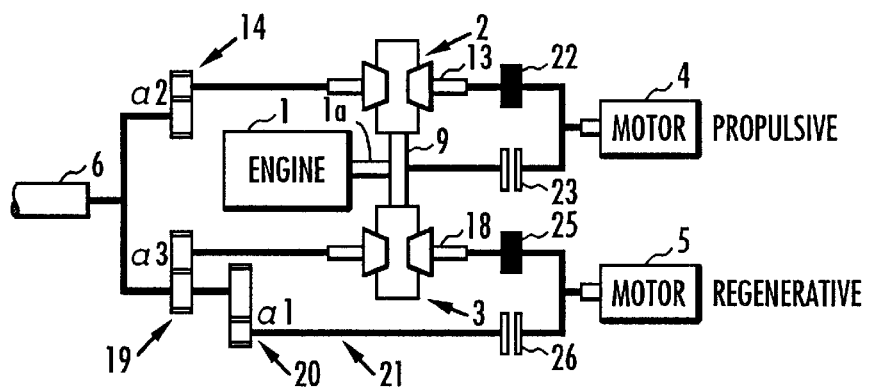

FIGS. 4(a) through 4(c) schematically show the operational states of the clutches 22, 23, 25, 26 and the operational states of the motors 4, 5 in the low-speed-range engine-driven mode, the temporarily used engine-driven mode, and the medium- and high-speed-range engine-driven mode, respectively. In FIGS. 4(a) through 4(c), the clutches 22, 23, 25, 26 that are shown as being solid are in an engaged state, and the clutches 22, 23, 25, 26 that are shown as having a gap are in a disengaged state. The engine 1 is in operation in each of FIGS. 4(a) through 4(c).

In the low-speed-range engine-driven mode, the controller 28 controls the clutches 22, 23, 25, 26 to be in the engaged state, the disengaged state, the disengaged state, and the engaged state, as shown in FIG. 4(a). Therefore, the rotatable shaft 4a of the first moor 4 is connected to the output shaft 13 of the first power distributor 2 and is disconnected from the output shaft 1a of the engine 1, and the rotatable shaft 5a of the second moor 5 is connected to the speed reducer 20 of the rotating transmitting means 21 and is disconnected from the second power distributor 3.

The controller 28 controls the first motor 4 and the second motor 5 to operate in the regenerative mode and the propulsive mode, respectively. Specifically, the controller 28 controls the engine 1, the first motor 4, and the second motor 5 as follows:

The controller 28 establishes a target output torque and a target rotational speed for the engine 1 for imparting an energy corresponding to the demand drive power and the vehicle speed to the drive wheels of the vehicle, from the demand drive power and the vehicle speed, using a predetermined map or the like. The target output torque and the target rotational speed are basically established as an operating point of the engine 1 to maximize the efficiency of fuel consumption by the engine 1, which is basically an operating point to maximize the throttle opening of the engine 1.

Then, the controller 28 controls the throttle opening of the engine 1 depending on the target output torque and the target rotational speed, and determines a target load torque for the engine 1 n order to converge the actual rotational speed of the engine 1 to the target rotational speed. The target load torque is determined as a value produced by correcting the target output torque with a control quantity that is calculated according to a feed-back control process, e.g., a proportional control process or a PI control process, depending on the difference between the actual rotational speed of the engine 1 and the target rotational speed for the engine 1. Specifically, the target load torque is determined to converge the target load torque to the target output torque when the actual rotational speed is converged to the target rotational speed.

Then, the controller 28 calculates target regenerative torques and target propulsive torques for the first and second motors 4, 5 from the target load torque determined as described above and a propulsive torque (proportional to the demand drive power) to be generated on the power output shaft 6 depending on the demand drive power for the vehicle, and controls the drive circuits 30, 31 to control currents to be supplied to the first and second motors 4, 5 according to the calculated target torques.

If the target load torque for the engine 1 is represented by Te, the propulsive torque of the power output shaft 6 by Tv, and the target torques for the first and second motors 4, 5 by T1, T2, then the target torques T1, T2 are given by the following equations (4), (5):

$$T1 = Te/2 \quad (4)$$

$$T2 = (Tv - \alpha 2 \cdot Te/2)/\alpha 1 \quad (5)$$

The speed reduction ratio between the output shaft 1a of the engine 1 and the ring gears 7, 8 (input shafts) of the power distributors 2, 3 is "1".

When the first and second motors 4, 5 are thus controlled, the electric power generated by the first motor 4 that operates in the regenerative mode and the electric power consumed by the second motor 5 that operates in the propulsive mode are basically (steadily) in equilibrium. The power transmitting apparatus operates with a transmission ratio between the speed reduction ratio $\alpha 1$ and the speed reduction ratio $\alpha 2$, and the output of the engine 1 is transmitted to the power output shaft 6 to propel the vehicle.

In the medium- and high-speed-range engine-driven mode, the controller 28 controls the clutches 22, 23, 25, 26 to be in the engaged state, the disengaged state, the engaged state, and the disengaged state, as shown in FIG. 4(c). Therefore, the rotatable shaft 4a of the first moor 4 is connected to the output shaft 13 of the first power distributor 2 and is disconnected from the output shaft 1a of the engine 1, and the rotatable shaft 5a of the second moor 5 is connected to the output shaft 18 of the second power distributor 3 and is disconnected from the speed reducer 20 of the rotating transmitting means 21.

The controller 28 controls the first motor 4 and the second motor 5 to operate in the propulsive mode and the regenerative mode, respectively. The controller 28 determines a target load torque Te for the engine 1, and calculates target propulsive torques and target regenerative torques for the first and second motors 4, 5 from the target load torque Te and a propulsive torque to be generated on the power output shaft 6 depending on the demand drive power for the vehicle. The controller 28 then controls the drive circuits 30, 31 to control currents to be supplied to the first and second motors 4, 5 according to the calculated target torques.

The target torques T1, T2 for the first and second motors 4, 5 are given by the following equations (6), (7):

$$T1 = (Tv - \alpha 3 \cdot Te/2)/(\alpha 2 - \alpha 3) \quad (6)$$

$$T2 = (Tv - \alpha 2 \cdot Te/2)/(\alpha 3 - \alpha 2) \quad (7)$$

When the first and second motors 4, 5 are thus controlled, the electric power consumed by the first motor 4 that operates in the propulsive mode and the electric power generated by the second motor 5 that operates in the regenerative mode re basically (steadily) in equilibrium. The power transmitting apparatus operates with a transmission ratio between the speed reduction ratio $\alpha 2$ and the speed reduction ratio $\alpha 3$, and the output of the engine 1 is transmitted to the power output shaft 6 to propel the vehicle.

In the temporarily used engine-driven mode upon transition between the low-speed-range engine-driven mode and the medium- and high-speed-range engine-driven mode, the controller 28 temporarily controls the clutches 22, 23, 25, 26 to be in the engaged state, the disengaged state, the disengaged state, and the disengaged state, as shown in FIG. 4(b). Therefore, the rotatable shaft 4a of the first moor 4 is connected to the output shaft 13 of the first power distributor 2 and is disconnected from the output shaft 1a of the engine 1, and the rotatable shaft 5a of the second moor 5 is disconnected to the second power distributor 3 and the speed reducer 20 of the rotating transmitting means 21.

The controller 28 controls the propulsive torque of the first motor 4 in order to set the rotational speed of the first motor 4 to "0". The target torque T1 for the first motor 4 is basically given by the following equation (8):

$$T1 = Tv/\alpha 2 \quad (8)$$

The target load torque Te for the engine 1 is basically determined in the same manner as with the low-speed-range engine-driven mode, and is of a value in the vicinity of the load torque Te=2·Tv/$\alpha 2$ where T2=0 according to the equations (5), (7).

The controller 28 adjusts the rotational speed of the second motor 5 to compensate for a change in the rotational speed of the rotatable shaft 5a thereof between the propulsive mode thereof in the low-speed-range engine-driven mode and the regenerative mode thereof in the medium- and high-speed-range engine-driven mode. More specifically, upon transition from the low-speed-range engine-driven mode to the medium- and high-speed-range engine-driven mode, the controller 28 adjusts the rotational speed of the rotatable shaft 5a of the second motor 5 to bring the rotational speed (including the rotational direction) of the input side (second motor 5 side) of the clutch 25 into substantial conformity with the rotational speed of the output side (second power distributor 3 side) of the clutch 25. Upon transition from the medium- and high-speed-range engine-driven mode to the low-speed-range engine-driven mode, the controller 28 adjusts the rotational speed of the rotatable shaft 5a of the second motor 5 to bring the rotational speed (including the rotational direction) of the input side (second motor 5 side) of the clutch 26 into substantial conformity with the rotational speed of the output side (speed reducer 20 side) of the clutch 26.

When the power transmitting apparatus is thus controlled, the drive power from the engine 1 is transmitted at the speed reduction ratio $\alpha 2$ to the power output shaft 6 to propel the vehicle. At this time, the rotational speed of the second motor 5 is adjusted to change the operational state of the second motor 2 smoothly between the propulsive mode thereof in the low-speed-range engine-driven mode and the regenerative mode thereof in the medium- and high-speed-range engine-driven mode. Thus, the vehicle smoothly changes from one of the low-speed-range engine-driven mode and the medium- and high-speed-range engine-driven mode to the other without causing behavioral changes of the vehicle.

In the temporarily used engine-driven mode, the controller 28 may, in principle, cut off the current supplied to the second motor 5 while keeping either one of the clutches 25, 26 engaged, to eliminate the torque generated by the rotatable shaft 5a of the second motor 5 to "0". In this case, however, the rotational speed of the second motor 5 cannot be adjusted upon transition from one of the low-speed-range engine-driven mode and the medium- and high-speed-range engine-driven mode to the other. Therefore, there may possibly occur undue behavioral changes of the vehicle due to the change in the operational state of the second motor 5 upon the mode transition.

By thus controlling the power transmitting apparatus in the engine-driven modes, the vehicle is propelled by the engine 1 used as a main propulsion source while the power transmitting apparatus is operating at a transmission ratio between the speed reduction ratios α1, α2. Since the vehicle can travel in a transmission ratio range between the relatively large speed reduction ratios α1, α2 (the low-speed-range engine-driven mode), even in a situation where a relatively large demand drive power is required in the low speed range of the vehicle, as is apparent from the equations (4), (5), the torque T1 (regenerative torque) of the first motor 4 and the torque T2 (propulsive torque) of the second motor 5 can be held to relatively small torques, and the vehicle can be propelled smoothly by generating the demand drive power on the drive wheels of the vehicle while operating the engine 1 at an operating point for a good efficiency of fuel consumption.

In the medium- and high-speed-range engine-driven mode where the vehicle travels in a transmission ratio range between the speed reduction ratios α2, α3, since the demand drive power for the vehicle is lower than in the low-speed-range engine-driven mode, the torque T1 (propulsive torque) of the first motor 4 and the torque T2 (regenerative torque) of the second motor 5 can be held to relatively small torques, and the vehicle can be propelled smoothly by generating the demand drive power on the drive wheels of the vehicle while operating the engine 1 at an operating point for a good efficiency of fuel consumption.

Figure 5:
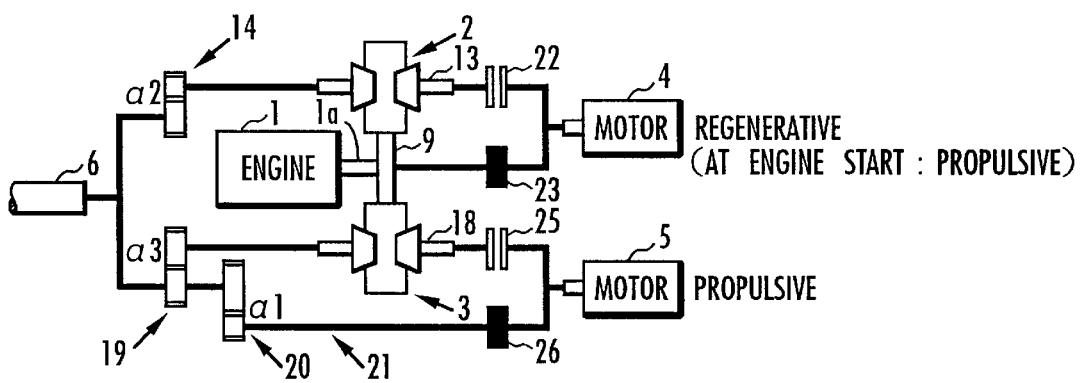
FIGS. 5(a) and 5(b) are schematic views, partly in block form, showing the manner in which the power transmitting apparatus shown in FIG. 1 operates.
Figure 5:
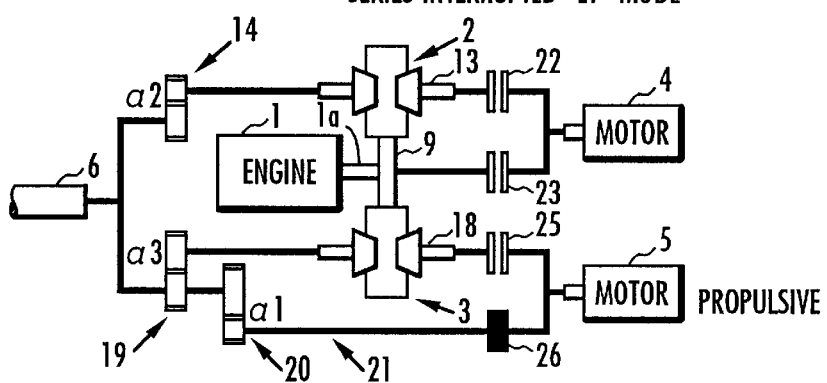
Figure 6:
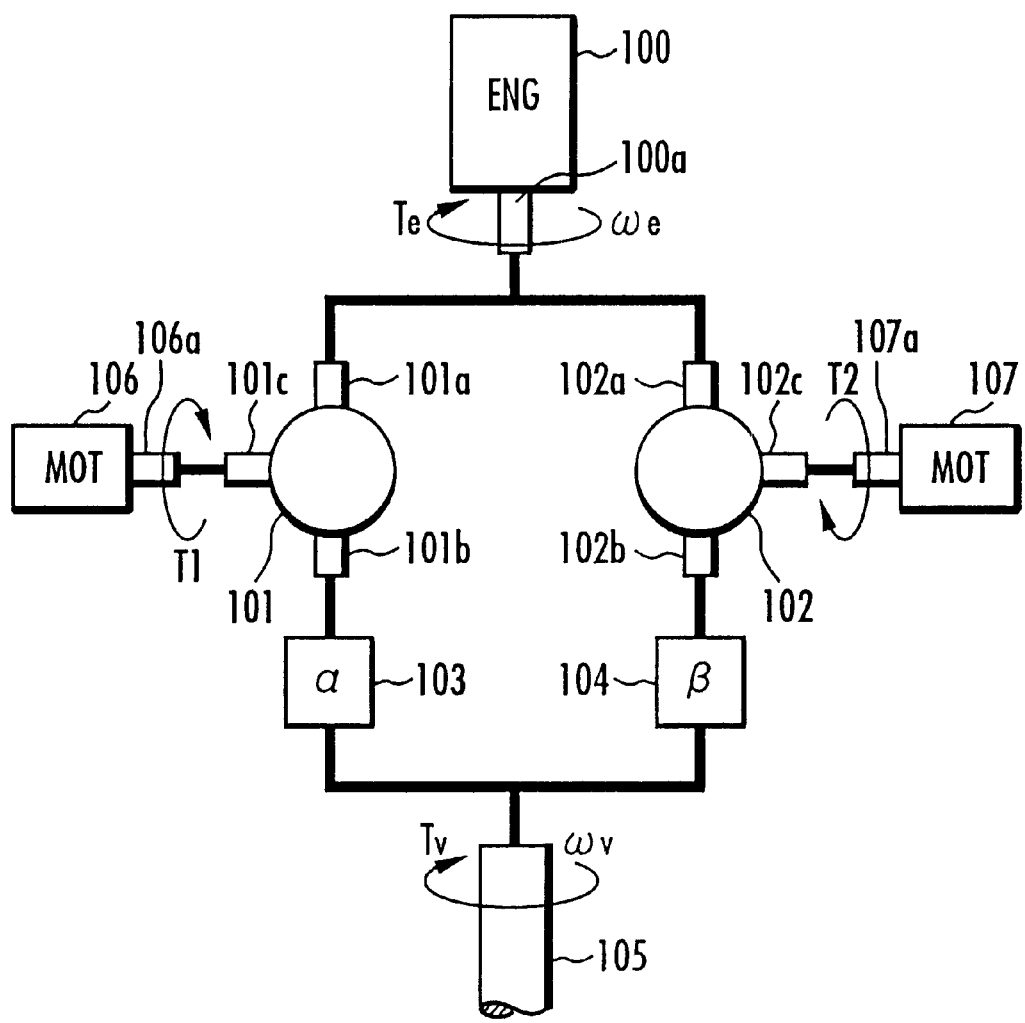
FIG. 6 is a schematic view, partly in block form, of a conventional power transmitting apparatus.

The EV mode will be described below with reference to FIGS. 5(a) and 5(b). FIGS. 5(a) and 5(b) schematically show the operational states of the clutches 22, 23, 25, 26 and the operational states of the motors 4, 5 in the series-operated EV mode and the series-interrupted EV mode, respectively.

In the series-operated EV mode, the controller 28 controls the clutches 22, 23, 25, 26 to be in the disengaged state, the engaged state, the disengaged state, and the engaged state, as shown in FIG. 5(a). Therefore, the rotatable shaft 4a of the first moor 4 is connected to the output shaft 1a of the engine 1 and is disconnected from the first power distributor 2, and the rotatable shaft 5a of the second moor 5 is connected to the speed reducer 20 of the rotating transmitting means 21 and is disconnected from the second power distributor 3.

The controller 28 controls the first motor 4 and the second motor 5 to operate in the regenerative mode and the propulsive mode, respectively, while operating the engine 1. At this time, the second motor 5 is controlled to achieve a target torque T2 ($\approx$Tv/α1) for transmitting, via the speed reducer 20, the torque Tv required by the power output shaft 6 depending on the demand drive power for the vehicle. The vehicle is thus propelled by the drive power from the second motor 5.

The controller 28 determines a target output for the engine 1 from the demand drive power for the vehicle and the vehicle speed using a predetermined map or the like, and determines a torque and a rotational speed at an operating point of the engine 1 which is capable of generating the target output at a best efficiency of fuel consumption as a target output torque and a target rotational speed for the engine 1. The target output for the engine 1 is set to an output that is slightly larger than a demand propulsive output for the vehicle which is determined from the demand drive power for the vehicle and the vehicle speed. The controller 28 controls the throttle opening depending on the target output torque and the target rotational speed for the engine 1, and controls the first motor 4 to achieve a target regenerative torque as a value produced by correcting the target output torque according to a feedback control process depending on the difference between the target rotational speed for the engine 1 and the actual rotational speed of the engine 1.

The output torque and rotational speed of the engine 1 are controlled at the target output torque and the target rotational speed, respectively, and the first motor 4 is operated in the regenerative mode by the output of the engine 1 to generate electric energy which is applied to charge the electric energy storage unit 29 (see FIG. 3).

In the series-interrupted EV mode, the controller 28 controls the clutches 22, 23, 25, 26 to be in the disengaged state, the disengaged state, the disengaged state, and the engaged state, as shown in FIG. 5(b). Therefore, the rotatable shaft 4a of the first moor 4 is disconnected from the output shaft 1a of the engine 1 and the first power distributor 2, and the rotatable shaft 5a of the second moor 5 is connected to the speed reducer 20 of the rotating transmitting means 21 and is disconnected from the second power distributor 3.

The controller 28 then stops the operation of the engine 1 and de-energizes the first motor 4, i.e., cuts off the current supplied to the first motor 4, and controls the second motor 5 in exactly the same manner as with the series-operated EV mode.

The vehicle is now propelled by the drive power from the second motor 5 in the same manner as with the series-operated EV mode. Since the engine 1 and the first motor 4 are held at rest at this time, the electric energy stored in the electric energy storage unit 29 is consumed by the second motor 5, and the remaining capacity of the electric energy storage unit 29 is gradually reduced (see FIG. 3).

For changing from the series-interrupted EV mode to the series-operated EV mode, the engine 1 needs to be started. The engine 1 is started by the first motor 4 used as a starter motor by controlling the clutches 22, 23, 25, 26 in the same manner as with the series-operated EV mode and temporarily operating the second motor 5 in the propulsive mode.

In the present embodiment, the vehicle is started in either one of the series-operated EV mode and the series-interrupted EV mode. Specifically, while the clutches 22, 23, 25, 26 are controlled as shown in FIG. 5(a) or 5(b), the second motor 5 is controlled to generate a predetermined propulsive torque, which is transmitted via the speed reducer 20 having the speed reduction ratio α1 to the power output shaft 6 for thereby starting to move the vehicle.

In the EV mode, as described above, the vehicle is propelled by the drive power of the second motor 5 which is transmitted via the speed reducer 20 to the power output shaft 6, and the operation of the engine 1 and the operation of the first motor 4 in the regenerative mode are intermittently repeated.

In the EV mode including the start of the vehicle, the drive power of the second motor 5 is transmitted via the speed reducer 20 having the large speed reduction ratio α1 directly to the power output shaft 6. Therefore, the vehicle can be started and travel in the EV mode without requiring a large propulsive torque from the second motor 5. Since the first motor 4 can be operated in the regenerative mode directly using the output of the engine 1 without affecting the travel of the vehicle based on the drive power of the second motor 4, the regenerative torque of the first motor 4 can be held to a relatively small torque, and the electric energy storage unit 29 can be charged with a good energy efficiency while operating the engine 1 at an operating point for a good efficiency of fuel consumption.

If the first motor 4 is not to operate in the regenerative mode at the start of the vehicle, then the current supplied to the first motor 4 may be cut off. With the current supplied to the first motor 4 being cut off, the vehicle can be started by engaging either one of the clutches 22, 23 when the engine 1 is at rest or is operated.

In the present embodiment, in either one of the engine-driven mode and the EV mode, the vehicle can be propelled according to a demand drive power that is efficiently produced without the need for a large torque on the first and second motors 4, 5. Thus, the capacities of the motors 4, 5, the drive circuits 30, 31, and the electric energy storage unit 29 can be smaller than those of the conventional power transmitting apparatus, and hence the sizes, costs, and weights of motors 4, 5, the drive circuits 30, 31, and the electric energy storage unit 29 can 20 be reduced. Since the engine 1 can be operated at an operating point for a good efficiency of fuel consumption while satisfying requirements for running performance of the vehicle, the hybrid vehicle is of good energy efficiency.

In the above embodiment, each of the power distributors 2, 3 comprises a differential gear mechanism. However, each of the power distributors 2, 3 may comprise a planetary gear mechanism.

Each of the clutches 22, 23, 25, 36 may comprise an ordinary clutch having fiction plates, or a clutch having rotatable shafts that can be interfitted.

Although a certain preferred embodiment of the present invention has been shown and described in detail, it should be understood that various changes and modifications may be made therein without departing from the scope of the appended claims.

What is claimed is:

1. A power transmitting apparatus for a hybrid vehicle, comprising:

first and second power distributors having respective input shafts for receiving a rotational drive power transmitted from an engine;

a power output shaft for outputting the rotational drive power transmitted from an output shaft of the first power distributor and an output shaft of the second power distributor, to drive wheels of the hybrid vehicle;

a first motor for applying a propulsive torque or a regenerative torque to another output shaft of said first power distributor;

a second motor for applying a propulsive torque or a regenerative torque to another output shaft of said second power distributor;

a first rotation transmitting system for transmitting rotation from said engine through said first power distributor to said power output shaft;

a second rotation transmitting system for transmitting rotation from said engine through said second power distributor to said power output shaft, said first rotation transmitting system having a speed reduction ratio greater than a speed reduction ratio of said second rotation transmitting system;

rotation transmitting means for transmitting a torque of said second motor to said power output shaft at a speed reduction ratio greater than the speed reduction ratio of said first rotation transmitting system; and first clutch means for selectively connecting a rotatable shaft of said second motor to said rotation transmitting means and said other output shaft of said second power distributor.

2. A power transmitting apparatus according to claim 1, further comprising:

second clutch means for selectively connecting a rotatable shaft of said first motor to an output shaft of said engine and said other output shaft of said first power distributor.

3. A method of controlling a power transmitting apparatus including first and second power distributors having respective input shafts for receiving a rotational drive power transmitted from an engine; a power output shaft for outputting the rotational drive power transmitted from an output shaft of the first power distributor and an output shaft of the second power distributor, to drive wheels of the hybrid vehicle; a first motor for applying a propulsive torque or a regenerative torque to another output shaft of said first power distributor; a second motor for applying a propulsive torque or a regenerative torque to another output shaft of said second power distributor; a first rotation transmitting system for transmitting rotation from said engine through said first power distributor to said power output shaft; a second rotation transmitting system for transmitting rotation from said engine through said second power distributor to said power output shaft, said first rotation transmitting system having a speed reduction ratio greater than a speed reduction ratio of said second rotation transmitting system; rotation transmitting means for transmitting a torque of said second motor to said power output shaft at a speed reduction ratio greater than the speed reduction ratio of said first rotation transmitting system; and first clutch means for selectively connecting a rotatable shaft of said second motor to said rotation transmitting means and said other output shaft of said second power distributor to propel the hybrid vehicle with said engine used as a propulsion source thereof while operating the power transmitting apparatus at a transmission ratio between the speed reduction ratio of said second rotation transmitting system and the speed reduction ratio of said rotation transmitting means, said method comprising the steps of:

while the hybrid vehicle is being propelled at a transmission ratio between the speed reduction ratio of said rotation transmitting means and the speed reduction ratio of said first rotation transmitting system, controlling said first clutch means to connect the rotatable shaft of said second motor to said rotation transmitting means, and controlling said first motor and said second motor to operate in a regenerative mode and a propulsive mode, respectively; and while the hybrid vehicle is being propelled at a transmission ratio between the speed reduction ratio of said first rotation transmitting system and the speed reduction ratio of said second rotation transmitting system, controlling said first clutch means to connect the rotatable shaft of said second motor to the other output shaft of said second power distributor, and controlling said first motor and said second motor to operate in a propulsive mode and a regenerative mode, respectively.

4. A method according to claim 3, further comprising the step of:
upon transition from one of the transmission ratio between the speed reduction ratio of said rotation transmitting means and the speed reduction ratio of said first rotation transmitting system and the transmission ratio between the speed reduction ratio of said first rotation transmitting system and the speed reduction ratio of said second rotation transmitting system to the other, temporarily controlling a rotational speed of said first motor at substantially zero, and controlling said first clutch to disconnect the rotatable shaft of said second motor from both the other output shaft of said second power distributor and said rotation transmitting means, and adjusting a rotational speed of said second motor.

5. A method of controlling a power transmitting apparatus including first and second power distributors having respective input shafts for receiving a rotational drive power transmitted from an engine; a power output shaft for outputting the rotational drive power transmitted from an output shaft of the first power distributor and an output shaft of the second power distributor, to drive wheels of the hybrid vehicle; a first motor for applying a propulsive torque or a regenerative torque to another output shaft of said first power distributor; a second motor for applying a propulsive torque or a regenerative torque to another output shaft of said second power distributor; a first rotation transmitting system for transmitting rotation from said engine through said first power distributor to said power output shaft; a second rotation transmitting system for transmitting rotation from said engine through said second power distributor to said power output shaft, said first rotation transmitting system having a speed reduction ratio greater than a speed reduction ratio of said second rotation transmitting system; rotation transmitting means for transmitting a torque of said second motor to said power output shaft at a speed reduction ratio greater than the speed reduction ratio of said first rotation transmitting system; and first clutch means for selectively connecting a rotatable shaft of said second motor to said rotation transmitting means and said other output shaft of said second power distributor, said method comprising the steps of:
for starting the hybrid vehicle, cutting off a current supplied to said first motor, controlling said first clutch means to connect the rotatable shaft of said second motor to said rotation transmitting means, and controlling said second motor to operate in a propulsive mode.

6. A method of controlling a power transmitting apparatus including first and second power distributors having respective input shafts for receiving a rotational drive power transmitted from an engine; a power output shaft for outputting the rotational drive power transmitted from an output shaft of the first power distributor and an output shaft of the second power distributor, to drive wheels of the hybrid vehicle; a first motor for applying a propulsive torque or a regenerative torque to another output shaft of said first power distributor; a second motor for applying a propulsive torque or a regenerative torque to another output shaft of said second power distributor; a first rotation transmitting system for transmitting rotation from said engine through said first power distributor to said power output shaft; a second rotation transmitting system for transmitting rotation from said engine through said second power distributor to said power output shaft, said first rotation transmitting system having a speed reduction ratio greater than a speed reduction ratio of said second rotation transmitting system; rotation transmitting means for transmitting a torque of said second motor to said power output shaft at a speed reduction ratio greater than the speed reduction ratio of said first rotation transmitting system; first clutch means for selectively connecting a rotatable shaft of said second motor to said rotation transmitting means and said other output shaft of said second power distributor; and second clutch means for selectively connecting a rotatable shaft of said first motor to an output shaft of said engine and said other output shaft of said first power distributor to propel the hybrid vehicle with said engine used as a propulsion source thereof while operating the power transmitting apparatus at a transmission ratio between the speed reduction ratio of said second rotation transmitting system and the speed reduction ratio of said rotation transmitting means, said method comprising the steps of:
while the hybrid vehicle is being propelled at a transmission ratio between the speed reduction ratio of said rotation transmitting means and the speed reduction ratio of said first rotation transmitting system, controlling said first clutch means to connect the rotatable shaft of said second motor to said rotation transmitting means, controlling said second clutch means to connect a rotatable shaft of said first motor to the other output shaft of said first power distributor, and controlling said first motor and said second motor to operate in a regenerative mode and a propulsive mode, respectively; and
while the hybrid vehicle is being propelled at a transmission ratio between the speed reduction ratio of said first rotation transmitting system and the speed reduction ratio of said second rotation transmitting system, controlling said first clutch means to connect the rotatable shaft of said second motor to the other output shaft of said second power distributor, controlling said second clutch means to connect the rotatable shaft of said first motor to the other output shaft of said first power distributor, and controlling said first motor and said second motor to operate in a propulsive mode and a regenerative mode, respectively.

7. A method according to claim 6, further comprising the step of:
upon transition from one of the transmission ratio between the speed reduction ratio of said rotation transmitting means and the speed reduction ratio of said first rotation transmitting system and the transmission ratio between the speed reduction ratio of said first rotation transmitting system and the speed reduction ratio of said second rotation transmitting system to the other, controlling said second clutch means to connect the rotatable shaft of said first motor to the other output shaft of said first power distributor, temporarily controlling a rotational speed of said first motor at substantially zero, and controlling said first clutch to disconnect the rotatable shaft of said second motor from both the other output shaft of said second power distributor and said rotation transmitting means, and adjusting a rotational speed of said second motor.

8. A method of controlling a power transmitting apparatus including first and second power distributors having respective input shafts for receiving a rotational drive power transmitted from an engine; a power output shaft for outputting the rotational drive power transmitted from an output shaft of the first power distributor and an output shaft of the second power distributor, to drive wheels of the hybrid vehicle; a first motor for applying a propulsive torque or a regenerative torque to another output shaft of said first power distributor; a second motor for applying a propulsive torque or a regenerative torque to another output shaft of said second power distributor; a first rotation transmitting system for transmitting rotation from said engine through said first power distributor to said power output shaft; a second rotation transmitting system for transmitting rotation from said engine through said second power distributor to said power output shaft, said first rotation transmitting system having a speed reduction ratio greater than a speed reduction ratio of said second rotation transmitting system; rotation transmitting means for transmitting a torque of said second motor to said power output shaft at a speed reduction ratio greater than the speed reduction ratio of said first rotation transmitting system; first clutch means for selectively connecting a rotatable shaft of said second motor to said rotation transmitting means and said other output shaft of said second power distributor; and second clutch means for selectively connecting a rotatable shaft of said first motor to an output shaft of said engine and said other output shaft of said first power distributor to propel the hybrid vehicle at a predetermined vehicle speed or lower with one of the motors used as a propulsion source thereof, said method comprising the steps of:

controlling said second motor to operate in a propulsive mode, controlling said first clutch means to connect the rotatable shaft of said second motor to said rotation transmitting means, and controlling said second clutch means to disconnect the rotatable shaft of said first motor from at least the other output shaft of said first power distributor.

9. A method according to claim 8, further comprising the steps of controlling said second clutch means to connect the rotatable shaft of said first motor to the output shaft of said engine, and controlling said first motor to operate in a regenerative mode while operating said engine.

10. A method according to claim 8, further comprising the steps of controlling said second clutch means to connect the rotatable shaft of said first motor to the output shaft of said engine, intermittently operating said engine, controlling said first motor to operate in a regenerative mode while said engine is operating, and for starting said engine from a stop, controlling said first motor in a propulsive mode to start said engine with a drive power of said first motor.

11. A method of controlling a power transmitting apparatus first and second power distributors having respective input shafts for receiving a rotational drive power transmitted from an engine; a power output shaft for outputting the rotational drive power transmitted from an output shaft of the first power distributor and an output shaft of the second power distributor, to drive wheels of the hybrid vehicle; a first motor for applying a propulsive torque or a regenerative torque to another output shaft of said first power distributor; a second motor for applying a propulsive torque or a regenerative torque to another output shaft of said second power distributor; a first rotation transmitting system for transmitting rotation from said engine through said first power distributor to said power output shaft; a second rotation transmitting system for transmitting rotation from said engine through said second power distributor to said power output shaft, said first rotation transmitting system having a speed reduction ratio greater than a speed reduction ratio of said second rotation transmitting system; rotation transmitting means for transmitting a torque of said second motor to said power output shaft at a speed reduction ratio greater than the speed reduction ratio of said first rotation transmitting system; first clutch means for selectively connecting a rotatable shaft of said second motor to said rotation transmitting means and said other output shaft of said second power distributor; and second clutch means for selectively connecting a rotatable shaft of said first motor to an output shaft of said engine and said other output shaft of said first power distributor said method comprising the steps of:

for starting the hybrid vehicle, controlling said second clutch means to disconnect the rotatable shaft of said first motor from at least the other output shaft of said first power distributor, controlling said first clutch means to connect the rotatable shaft of said second motor to said rotation transmitting means, and controlling said second motor to operate in a propulsive mode.

* * * * *